United States Patent
Srisooksai et al.

(10) Patent No.: US 12,526,672 B2
(45) Date of Patent: Jan. 13, 2026

(54) FREQUENCY DETERMINATION METHOD AND FREQUENCY DETERMINATION APPARATUS

(71) Applicant: KYOSAN ELECTRIC MFG. CO., LTD., Yokohama (JP)

(72) Inventors: Tossaporn Srisooksai, Machida (JP); Nobuo Katsuma, Tokyo (JP); Shuji Nambu, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 363 days.

(21) Appl. No.: 18/446,785

(22) Filed: Aug. 9, 2023

(65) Prior Publication Data
US 2023/0388834 A1  Nov. 30, 2023

Related U.S. Application Data

(63) Continuation of application No. PCT/JP2022/004192, filed on Feb. 3, 2022.

(30) Foreign Application Priority Data

Feb. 12, 2021  (JP) ................. 2021-020588

(51) Int. Cl.
*H04W 24/08* (2009.01)
*B61L 27/70* (2022.01)
(Continued)

(52) U.S. Cl.
CPC ............ *H04W 24/08* (2013.01); *B61L 27/70* (2022.01); *H04B 17/336* (2015.01); *H04B 17/3913* (2015.01)

(58) Field of Classification Search
CPC .............................. H04W 24/08; H04B 17/336
See application file for complete search history.

(56) References Cited

U.S. PATENT DOCUMENTS

| 2020/0205060 A1* | 6/2020 | Karimli | H04W 24/10 |
| 2022/0153320 A1* | 5/2022 | Liu | G06N 3/08 |
| 2022/0263688 A1* | 8/2022 | Srisooksai | H04W 16/14 |

FOREIGN PATENT DOCUMENTS

JP  2012-090328 A  5/2012

OTHER PUBLICATIONS

The extended European search report of the corresponding EP application No. 22752676.1 mailed Nov. 28, 2024.
(Continued)

*Primary Examiner* — Zhiren Qin
(74) *Attorney, Agent, or Firm* — Muncy, Geissler, Olds & Lowe, P.C.

(57) ABSTRACT

A frequency determination apparatus (30) acquires a past dataset in which given frequency-specific time-series data indicating frequency-specific communication status of a wireless base station (10) based on a signal-to-noise ratio (SNR) over a predetermined monitoring period in time series is associated with frequency-specific evaluation value data indicating an evaluation value evaluating the communication status during a subsequent period following the monitoring period by frequency. The frequency determination apparatus (30) generates an evaluation value inference machine learning model. The frequency determination apparatus (30) inputs the frequency-specific time-series data with a given preceding period as the monitoring period to the evaluation value inference machine learning model to acquire an output of the frequency-specific evaluation value data with a future period following the relevant preceding period as the subsequent period, and determines a frequency to be used for the wireless communication based on the acquired frequency-specific evaluation value data.

9 Claims, 10 Drawing Sheets

(51) Int. Cl.
  *H04B 17/336*    (2015.01)
  *H04B 17/391*    (2015.01)

(56) References Cited

OTHER PUBLICATIONS

English translation of International Search Report of PCT/JP2022/004192 mailed Apr. 19, 2022.

* cited by examiner

[LEARNING OF COMMUNICATION STATUS INFERENCE MACHINE LEARNING MODEL]

[LEARNING OF COMMUNICATION STATUS INFERENCE MACHINE LEARNING MODEL]

FREQUENCY DETERMINATION METHOD AND FREQUENCY DETERMINATION APPARATUS

CROSS REFERENCE TO RELATED APPLICATIONS

This application is a continuation of International Patent Application No. PCT/JP2022/004192, having an international filing date of Feb. 3, 2022, which designated the United States, the entirety of which is incorporated herein by reference. Japanese Patent Application No. 2021-020588 filed on Feb. 12, 2021 is also incorporated herein by reference in its entirety.

BACKGROUND OF THE INVENTION

In a wireless train control system called communication-based train control (CBTC) utilizing wireless communication for train control, contemplated is the use of frequency bands called industrial, scientific and medical (ISM) bands requiring no license for wireless communication between ground vehicles. There are various wireless communication standards using the ISM bands, such as wireless LAN (IEEE802.11) and Bluetooth (registered trademark) (IEEE802.15.1). These standards are utilized in various other wireless communication systems, and it is thus inevitable to receive interference from the other systems.

The wireless train control system requires handover that switches wireless base stations to communicate with as a train moves. In the handover, it is preferable that a frequency used for the wireless communication with a new wireless base station be a frequency with little interference. Meanwhile, in the handover, delay may occur. Japanese Unexamined Patent Application Publication No. 2012-90328 discloses a technique for realizing the handover without delay. Japanese Unexamined Patent Application Publication No. 2012-90328 discloses that a plurality of communication frequencies that do not interfere with communication frequencies of other wireless base stations are determined for each wireless base station, field intensities of the plurality of communication frequencies are regularly checked, an optimal communication frequency is selected based on the field intensities, and the train performs the wireless communication with the relevant wireless base station at the selected optimal wireless communication frequency.

For wireless communication utilizing the ISM bands, there is a technique called cognitive wireless communication by which to search for a vacant wireless communication channel and switch to a wireless communication system to be used. In the cognitive wireless communication, spectrum sensing is required to search for a vacant wireless communication channel. The wireless communication channel means a frequency. However, in order to apply the cognitive wireless communication to a wireless train control system in which high reliability is sought, higher accuracy is required for spectrum sensing as well. Of course, in other types of wireless communication as well as in the cognitive wireless communication, selecting the vacant frequency with high accuracy is a useful method for determining the frequency to be used. Especially, in the wireless train control system, since an onboard system moves along with a train on the move, it is required to predictively search for and select the vacant frequency at a moving destination before moving and determine the frequency to be used.

DETAILED DESCRIPTION

Figure 1:
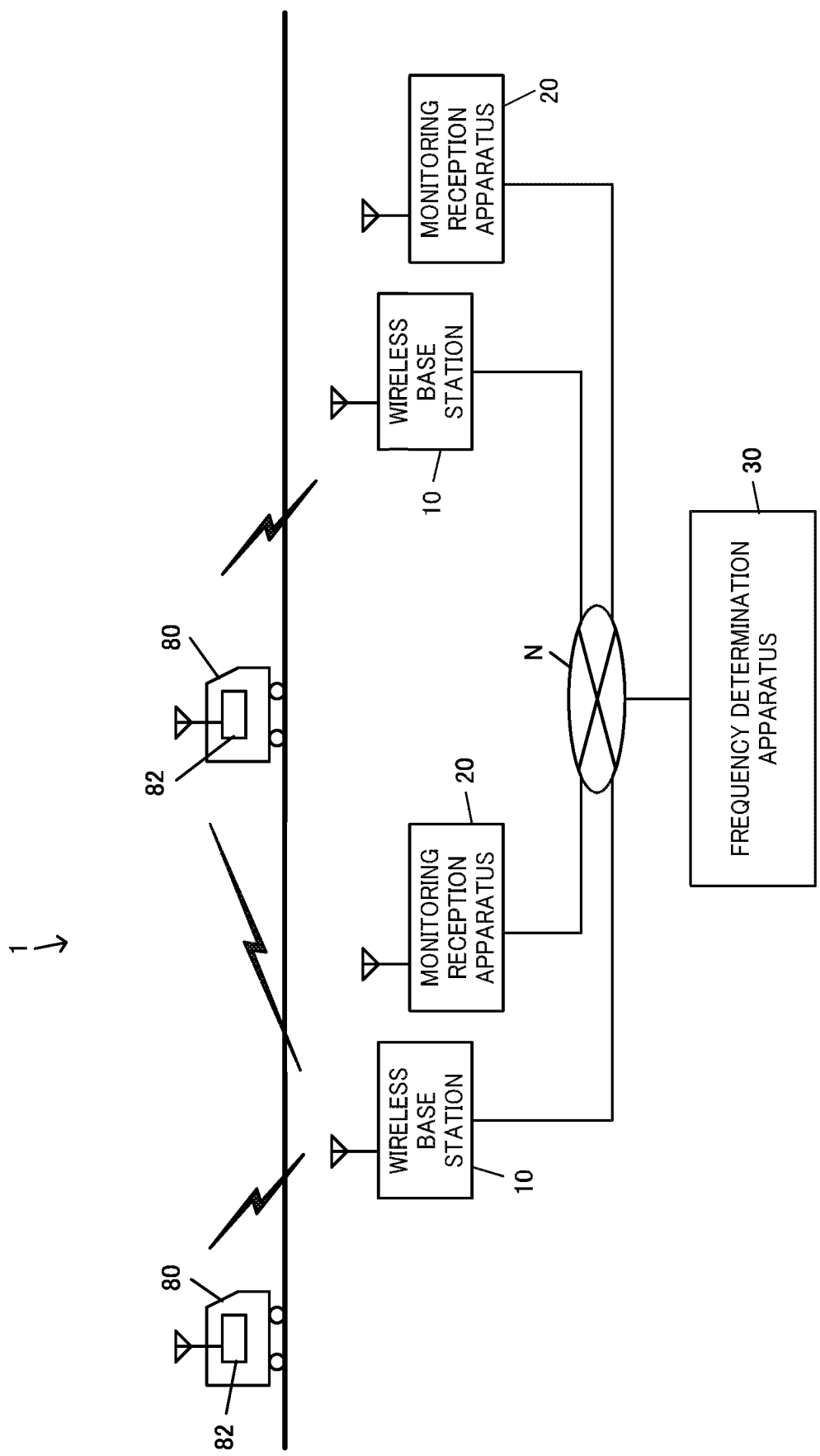
FIG. 1 is a configuration example of a wireless train control system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

A first aspect to solve the above-described issues is
a frequency determination method executed by a computer system,
the computer system executing:
acquiring a past dataset in which given frequency-specific time-series data indicating frequency-specific communication status of a wireless base station installed along a railroad line to perform wireless communication with an onboard system based on a signal-to-noise ratio (SNR) over a predetermined monitoring period in time series is associated with frequency-specific evaluation value data indicating an evaluation value evaluating the communication status during a subsequent period following the monitoring period by frequency;
generating, using the past dataset, an evaluation value inference machine learning model that takes an input of the frequency-specific time-series data and outputs the frequency-specific evaluation value data; and
inputting the frequency-specific time-series data with a given preceding period as the monitoring period to the evaluation value inference machine learning model to acquire an output of the frequency-specific evaluation value data with a future period following the relevant preceding period as the subsequent period, and determining a frequency to be used for the wireless communication based on the acquired frequency-specific evaluation value data.

A second aspect of the present disclosure is a frequency determination apparatus including an acquisition section that acquires the past dataset in which the given frequency-specific time-series data indicating the frequency-specific communication status of the wireless base station installed along the railroad line to perform the wireless communication with the onboard system based on the SNR over the predetermined monitoring period in time series is associated with the frequency-specific evaluation value data indicating the evaluation value evaluating the communication status during the subsequent period following the monitoring period by frequency, a generation section that generates, using the past dataset, the evaluation value inference machine learning model that takes the input of the frequency-specific time-series data and outputs the frequency-specific evaluation value data, and a determination section that inputs the frequency-specific time-series data with the given preceding period as the monitoring period to the evaluation value inference machine learning model to acquire the output of the frequency-specific evaluation value data with the future period following the relevant preceding period as the subsequent period, and determines the frequency to be used for the wireless communication based on the acquired frequency-specific evaluation value data.

As a result, in the first and second aspects, it is possible to realize a technique capable of selecting a vacant frequency with high accuracy as a technique to determine the frequency to be used in a wireless train control system. That is, it is possible to generate the evaluation value inference machine learning model that takes the input of the time-series data indicating the frequency-specific communication status based on the SNR at which the wireless base station performs the wireless communication with the onboard system over the predetermined monitoring period, and outputs the evaluation value data of the communication status during the subsequent period following the relevant monitoring period. It is then possible to determine the frequency to be used for the wireless communication by the wireless base station based on the frequency-specific evaluation value data during the subsequent period acquired in response to the input of the frequency-specific time-series communication status data during the preceding period to the evaluation value inference machine learning model. As a result, it is possible to infer the communication status during the future period following the relevant preceding period as the evaluation value from the frequency-specific communication status during the preceding period. Consequently, it is possible to realize the technique capable of selecting the vacant frequency with high accuracy as the technique to determine the frequency to be used in the wireless train control system.

The frequency determination method may be configured such that the evaluation value inference machine learning model is a recurrent neural network, and the past dataset includes a dataset of a plurality of pieces of the frequency-specific time-series data during monitoring periods shifting behind in order to partially overlap and the frequency-specific evaluation value data corresponding to each of the plurality of pieces of the frequency-specific time-series data.

As a result, in some embodiments, the past dataset includes the dataset of the frequency-specific time-series data during each of the monitoring periods shifting behind in order to partially overlap and the frequency-specific evaluation value data during the subsequent period following each of the monitoring periods. Accordingly, the past dataset is appropriate data for generating the evaluation value inference machine learning model that is the recurrent neural network.

The frequency determination method may be configured such that determining the frequency to be used includes selecting candidate frequencies based on the acquired frequency-specific evaluation value data, and determining the frequency to be used this time using a used frequency determined last time and the candidate frequencies.

As a result, in some embodiments, it is possible to select the candidate frequencies based on the frequency-specific evaluation value data during the subsequent period acquired using the evaluation value inference machine learning model, and determine the frequency to be used this time using the selected candidate frequencies and the used frequency used last time. This enables preferentially determining the used frequency used last time as the frequency to be used this time. Consequently, the onboard system can avoid complication of processing caused by frequently changing the frequency to be used for the wireless communication.

The frequency determination method may be configured such that acquiring the past dataset includes sequentially acquiring communication status data by inputting data indicating a radio wave environment of the wireless base station in time series to a communication status inference machine learning model that has undergone learning based on training data in which the data indicating the radio wave environment of the wireless base station is associated with the frequency-specific communication status under the relevant radio wave environment, and acquiring the past dataset, with the sequentially acquired communication status data, by 1) setting data corresponding to the monitoring period as the frequency-specific time-series data, and 2) setting data obtained by calculating an evaluation value by frequency from data corresponding to the subsequent period following the relevant monitoring period as the frequency-specific evaluation value data.

As a result, in some embodiments, it is possible to acquire the past dataset based on the data indicating the actual radio wave environment of the wireless base station. The evaluation value inference machine learning model is generated using this past dataset. Consequently, inference accuracy of the evaluation value inference machine learning model is enhanced, and more accurate spectrum sensing can be realized.

The frequency determination method may be configured such that the communication status inference machine learning model includes a sub-model and a main model, the sub-model is a model that has undergone learning based on training data in which the data indicating the radio wave environment is associated with frequency-specific noise presence/absence information, the main model is a model that has undergone learning based on training data in which the data indicating the radio wave environment and the noise presence/absence information are associated with the frequency-specific communication status, and sequentially acquiring the communication status data includes acquiring the frequency-specific noise presence/absence information by inputting the data indicating the radio wave environment to the sub-model, and acquiring the communication status data by inputting the data indicating the radio wave environment and the acquired frequency-specific noise presence/absence information to the main model.

As a result, in some embodiments, the communication status inference machine learning model includes the sub-model and the main model. The sub-model is the model that takes an input of the data indicating the radio wave environment of the wireless base station and outputs the frequency-specific noise presence/absence information. The main model is the model that takes an input of the data indicating the radio wave environment and the frequency-specific noise presence/absence information output from the sub-model and outputs the frequency-specific communication status. Accordingly, the frequency-specific time-series communication status data acquired using the communication status inference machine learning model becomes the data with higher accuracy in consideration of the presence or absence of the noise. This enhances the accuracy of the past dataset acquired using the communication status inference machine learning model, and also enhances the inference accuracy of the evaluation value inference machine learning model generated using this past dataset. Consequently, more accurate spectrum sensing can be realized.

Exemplary embodiments are described below. Note that the following exemplary embodiments do not in any way limit the scope of the content defined by the claims laid out herein. Note also that all of the elements described in the present embodiment should not necessarily be taken as essential elements.

A preferred embodiment of the present disclosure is described below with reference to the drawings. The present disclosure is not limited by the embodiment described below, and embodiments to which the present disclosure is applicable are not limited to the following embodiment. In the drawings, identical elements are denoted with identical reference signs.

[System Configuration]

FIG. 1 is a configuration example of a wireless train control system 1 according to the present embodiment. As illustrated in FIG. 1, the wireless train control system 1 of the present embodiment includes wireless base stations 10, monitoring reception apparatuses 20, and a frequency determination apparatus 30. The wireless base stations 10 and the monitoring reception apparatuses 20 are installed along a railroad line. The frequency determination apparatus 30 is installed at a command center or the like. The apparatuses are communicably connected to one another via a terrestrial transmission line N.

Wireless communication between the wireless base stations 10 and onboard systems 82 mounted in trains 80 running on railroad tracks is wireless communication using industrial, scientific and medical (ISM) bands such as 2.4-GHz band, 5.7-GHz band, and 920-MHz band. In the wireless communication, cognitive wireless communication is performed to search for a frequency not used by other communication systems and perform the wireless communication while switching among wireless communication standards and wireless channels.

The plurality of wireless base stations 10 are installed along the railroad line such that their communicable ranges partially overlap to enable the onboard systems 82 in the trains 80 running on the railroad tracks to perform continuous wireless communication with the frequency determination apparatus 30. The wireless base stations 10 are capable of establishing wireless channels with a predetermined number of trains 80 and perform the wireless communication with the onboard systems 82 in the trains 80 via the wireless channels determined under instructions from the frequency determination apparatus 30.

The monitoring reception apparatuses 20 are installed to acquire data indicating radio wave environments of the corresponding wireless base stations 10. The monitoring reception apparatuses 20 are installed in the vicinity of the corresponding wireless base stations 10, thereby to receive wireless signals around the corresponding wireless base stations 10, and output the data indicating the radio wave environments to the frequency determination apparatus 30. Although FIG. 1 illustrates only two each of the wireless base stations 10 and monitoring reception apparatuses 20, a plurality of stations and apparatuses are actually installed along the railroad line. For each of the wireless base stations 10, the frequency determination apparatus 30 infers the communication status around the wireless base stations 10 based on the data indicating the radio wave environments input from the corresponding monitoring reception apparatuses 20. The frequency determination apparatus 30 then dynamically allocates wireless channels related to the cognitive wireless communication between the wireless base stations 10 and the onboard systems 82 in the trains 80, based on the inferred communication status. For example, at handover between the wireless base stations 10, the frequency determination apparatus 30 determines a vacant frequency as a wireless channel to be allocated based on future communication status inferred in real time around the next wireless base station 10. Then, the frequency determination apparatus 30 notifies the determined wireless channel to the onboard system 82 in the train 80 and the wireless base station 10. The wireless channel is a term used in the field of communication technology, and means a frequency, more specifically, a frequency band. Thus, determining the wireless channel to be used corresponds to determining the frequency to be used. In the following description, the frequency is referred to as the channel, as appropriate.

[Frequency Determination Apparatus]

Figure 2:
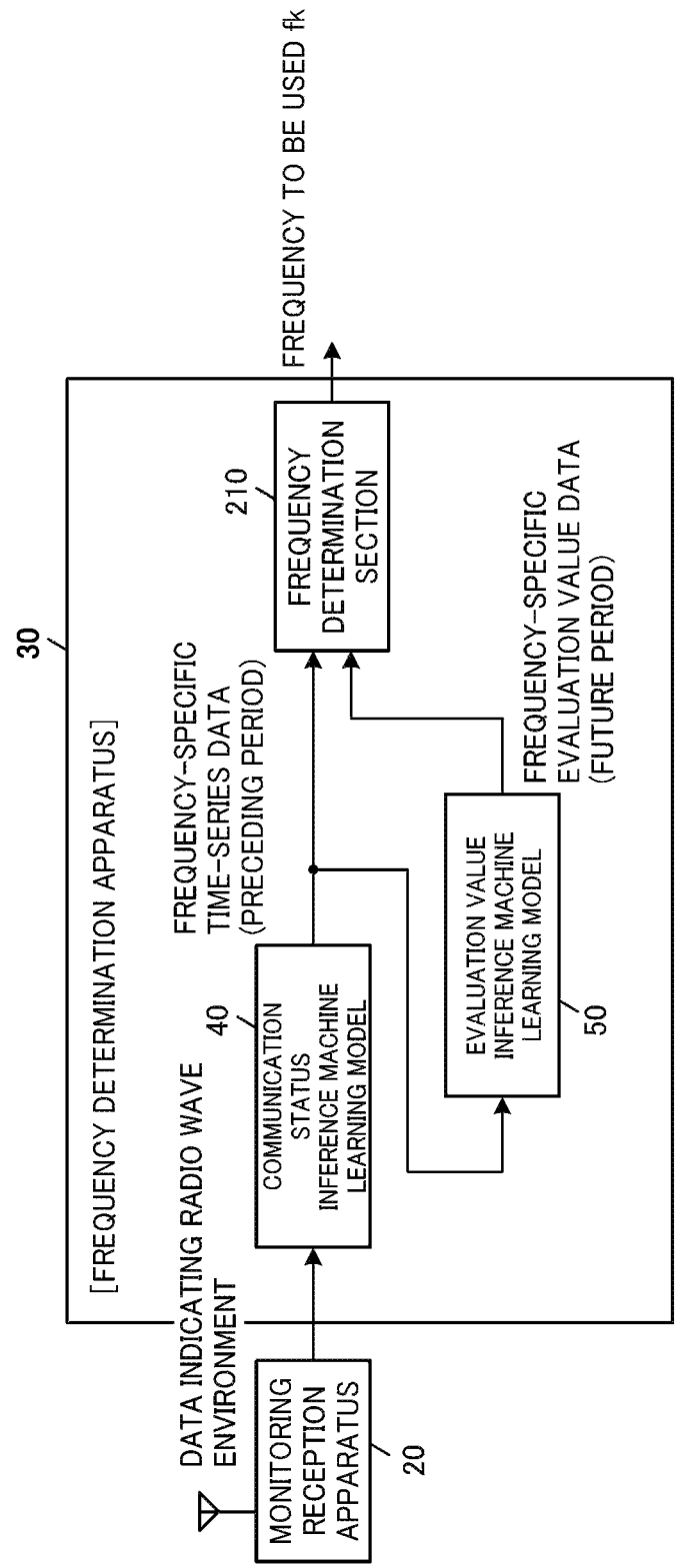
FIG. 2 is a major configuration diagram of a frequency determination apparatus.

FIG. 2 is a diagram illustrating a major configuration of the frequency determination apparatus 30 related to the determination of the wireless channel to be used according to the present embodiment. As illustrated in FIG. 2, the frequency determination apparatus 30 includes, as the major configuration related to the determination of the wireless channel to be used, a communication status inference machine learning model 40, an evaluation value inference machine learning model 50, and a frequency determination section 210. The communication status inference machine learning model 40 and the evaluation value inference machine learning model 50 are generated for each wireless base station 10. Although the following describes a single wireless base station 10 to make the description simple and clear, the same applies to the other wireless base stations 10.

(A) Communication Status Inference Machine Learning Model

The communication status inference machine learning model 40 is a machine learning model for performing spectrum sensing, that is, based on the data indicating the radio wave environment input from the monitoring reception apparatus 20, infers frequency-specific communication status around the wireless base station 10 corresponding to the relevant monitoring reception apparatus 20.

The communication status inference machine learning model 40 is implemented by a convolutional neural network (CNN) in the present embodiment, but may be implemented by another neural network. The communication status inference machine learning model 40 is a machine learning model that has undergone learning using training data as described later, and has a weight coefficient determined therefor. Since the monitoring reception apparatus 20 is installed in the vicinity of the wireless base station 10, the wireless signal received by the monitoring reception apparatus 20 may be considered as the wireless signal received by the wireless base station 10. This significantly shortens a processing time required for inference of the communication status, and enables realization of the inference of the communication status that is near real-time inference or can be said to be real-time inference.

Then, the communication status inference machine learning model 40 outputs the frequency-specific communication status around the relevant monitoring reception apparatus 20 when the wireless signal input as the data indicating the radio wave environment is received by the monitoring reception apparatus 20. This frequency-specific communication status is the communication status around the corresponding wireless base station 10. The frequency-specific communication status is the communication status based on frequency by wireless channel, for example. The communication status is classified into a plurality of stages based on a signal-to-noise ratio (SNR) at which the wireless base station 10 performed wireless communication under the relevant wireless environment. In the present embodiment, the communication status is classified into four stages including interference levels "0" to "3". However, the classification may have three or less stages or may have five or more stages. As the interference level becomes higher (larger), the possibility of the wireless communication being performed at the relevant frequency (the relevant frequency being used) is higher. In the wireless train control system 1, the wireless communication being performed means that the relevant frequency is being used by another wireless communication system, which causes noises. Thus, the higher (larger) the interference level becomes, the more the noise increases.

Figure 3:
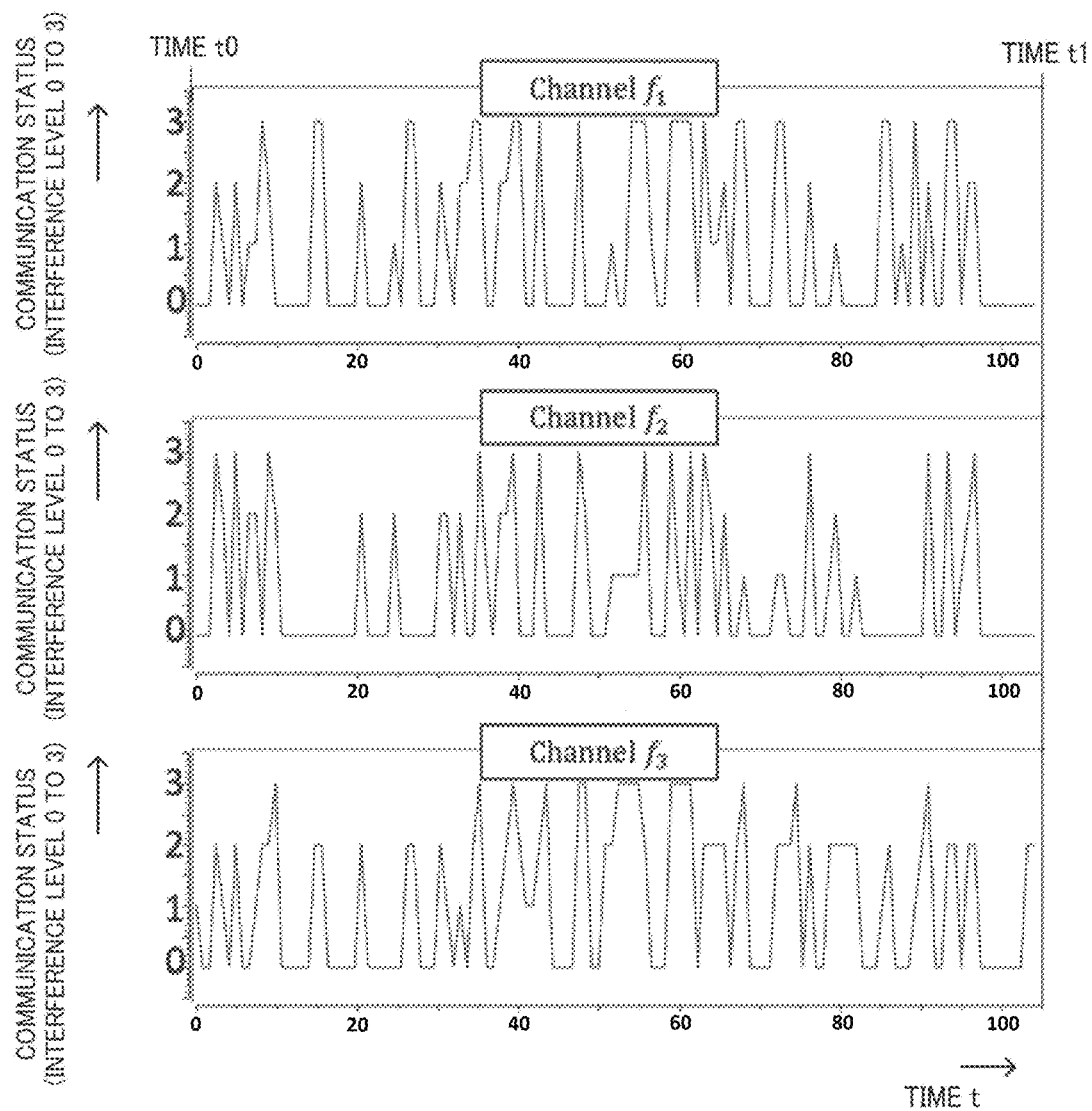
FIG. 3 is an output example of a communication status inference machine learning model.

FIG. 3 is an output example from the communication status inference machine learning model 40. In FIG. 3, the output example including the communication status of three frequencies (wireless channels) f1, f2, and f3 is illustrated with a horizontal axis representing time t and a vertical axis representing the interference level of the communication status. As illustrated in FIG. 3, the communication status inference machine learning model 40 takes an input of the data indicating the radio wave environment in time series from the monitoring reception apparatus 20, and outputs the frequency-specific communication status in time series. In FIG. 3, the communication status output by the communication status inference machine learning model 40 is each shown as a temporally continuous graph. However, the process performed by the frequency determination apparatus 30 is actually a digital process, and thus the communication status is time-series data (frequency-specific time-series data) that is discrete at predetermined time intervals.

Figure 4:
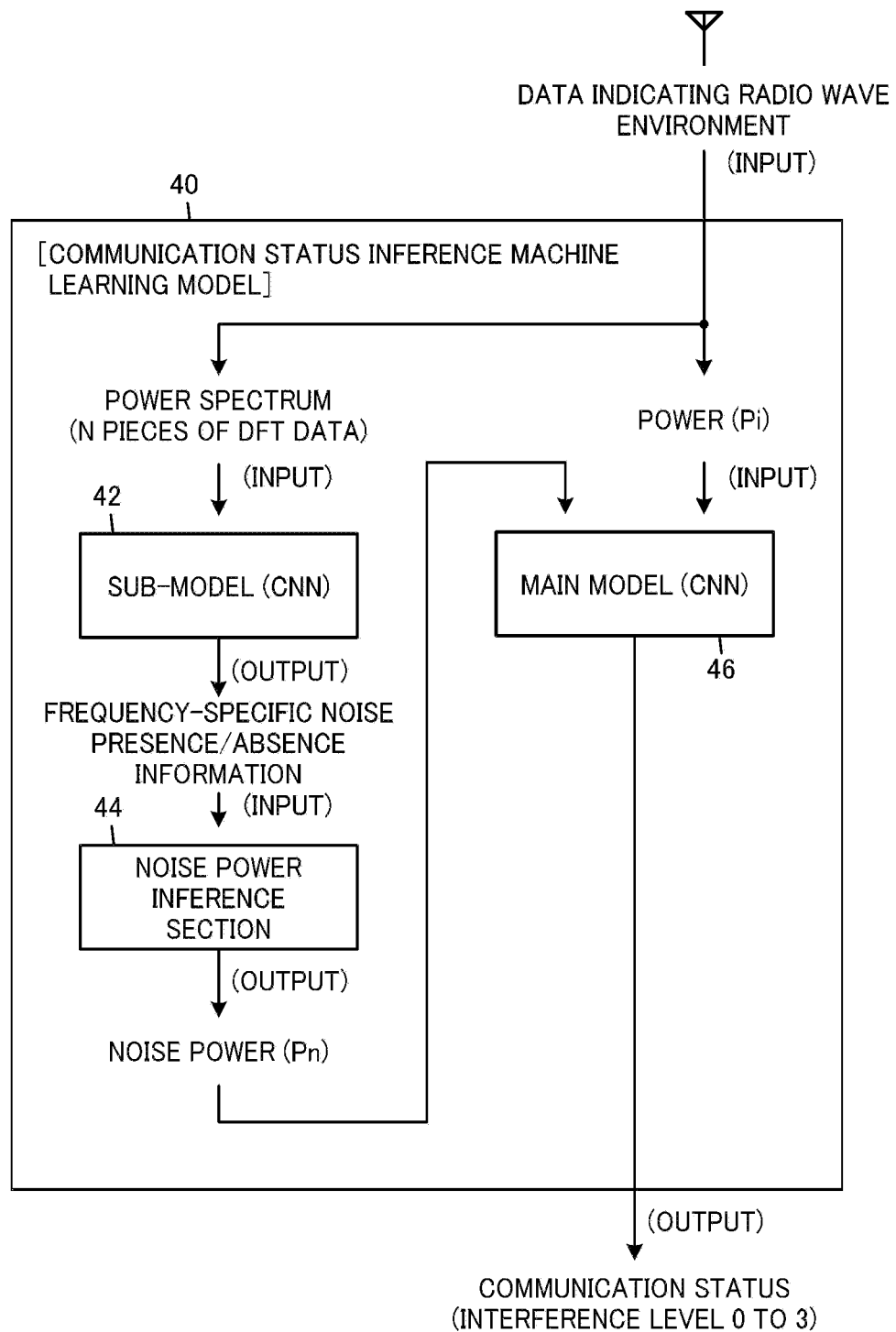
FIG. 4 is a configuration example of the communication status inference machine learning model.

FIG. 4 is a diagram illustrating a configuration of the communication status inference machine learning model 40. As illustrated in FIG. 4, the communication status inference machine learning model 40 includes a sub-model 42, a noise power inference section 44, and a main model 46. The sub-model 42 and the main model 46 are each implemented by a convolutional neural network, but may be implemented by another neural network.

The sub-model 42 is a machine learning model for inferring presence or absence of the noise by frequency based on the data indicating the radio wave environment input from the monitoring reception apparatus 20. The presence or absence of the noise is classified based on the interference levels of the communication status. The communication status at the interference levels "1 to 3" is classified as "presence of the noise", and the communication status at the interference level "0" is classified as "absence of the noise", for example. The sub-model 42 takes an input of a frequency-specific power spectrum of the wireless signal received by the monitoring reception apparatus 20 as the data indicating the radio wave environment. In the present embodiment, the sub-model 42 takes, as the frequency-specific power spectrum, an input of N pieces of data obtained by a discrete Fourier transform with normalization of an amplitude and a phase of the wireless signal received by the monitoring reception apparatus 20. In addition, since the inference by the sub-model 42 is repeatedly performed at a predetermined time intervals, the presence or absence of the noise by frequency output by the sub-model 42 is discrete time-series data.

The noise power inference section 44 calculates an inference value of noise power Pn included in the wireless signal received by the monitoring reception apparatus 20 based on frequency-specific noise presence/absence information output by the sub-model 42. The sub-model 42 takes an input of the data indicating the radio wave environment from the monitoring reception apparatus 20, and outputs the presence or absence of the noise in time series by frequency. The noise power inference section 44 extracts the data indicating the radio wave environment, input from the monitoring reception apparatus 20, corresponding to the "absence of the noise" of the presence or absence of the noise by frequency output by the sub-model 42, that is, signal power of the wireless signal. Then, the noise power inference section 44 calculates, as the inference value of the noise power Pn, a mean value of a predetermined number of extracted signal power selected in ascending order. Calculation by the noise power inference section 44 does not have to be performed at the time intervals similar to the time intervals in which the sub-model 42 or the main model 46 performs the inference, but may be performed at the time intervals longer than the relevant time intervals.

The main model 46 is a machine learning model for inferring the frequency-specific communication status based on the data indicating the radio wave environment input from the monitoring reception apparatus 20 and the frequency-specific noise presence/absence information input from the sub-model 42. The main model 46 takes an input of the signal power (time-averaged amplitude square) of the wireless signal received by the monitoring reception apparatus 20 as the data indicating the radio wave environment. In addition, the main model 46 takes an input of the frequency-specific noise power Pn output from the noise power inference section 44 as the frequency-specific noise presence/absence information. Then, the main model 46, based on the signal power obtained by normalizing the signal power of the wireless signal by the noise power Pn by frequency, infers and outputs the interference levels "0 to 3" classifying the frequency-specific communication status into four stages. In addition, since the inference by the main model 46 is repeatedly performed at predetermined time intervals as that by the sub-model 42, the frequency-specific communication status output by the main model 46 is discrete time-series data. The frequency-specific time-series communication status data output by the main model 46 is the output of the communication status inference machine learning model 40.

In the inference of the communication status using the communication status inference machine learning model 40, the data indicating the radio wave environment based on the wireless signal received by the monitoring reception apparatus 20 is first input to the sub-model 42. The frequency-specific noise presence/absence information included in the input data indicating the radio wave environment is output from the sub-model 42. Next, the noise presence/absence information is input to the noise power inference section 44, and the noise power Pn is output from the noise power inference section 44. Then, the noise power Pn and the data indicating the radio wave environment based on the wireless signal received by the monitoring reception apparatus 20 earlier are input to the main model 46, and the frequency-specific communication status matching the input data indicating the radio wave environment is output from the main model 46.

Figure 5A:
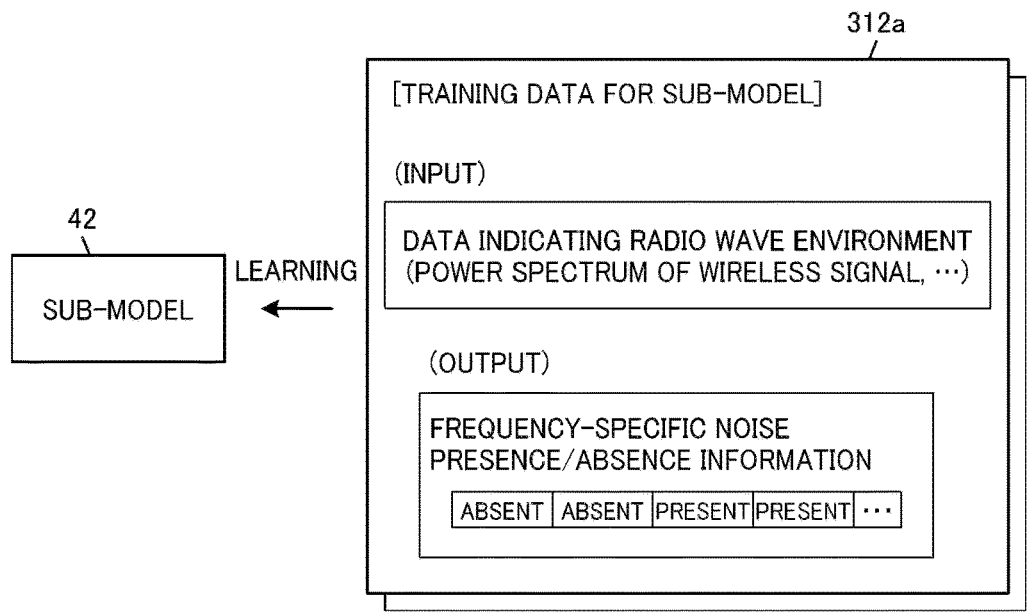
FIG. 5A is an explanatory diagram of learning of the communication status inference machine learning model.
Figure 5B:
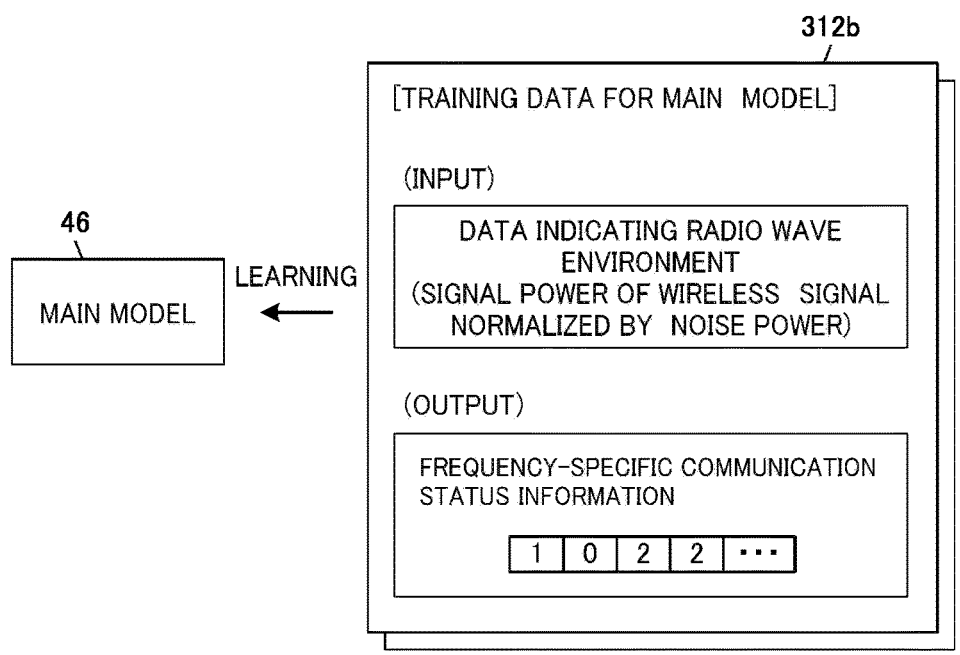
FIG. 5B is an explanatory diagram of learning of the communication status inference machine learning model.

FIG. 5A and FIG. 5B are explanatory diagrams of learning (machine learning) of the communication status inference machine learning model 40. As illustrated in FIG. 5A and FIG. 5B, the communication status inference machine learning model 40 is subjected to learning using a plurality of pieces of training data 312 prepared in advance. Specifically, the communication status inference machine learning model 40 includes the sub-model 42 and the main model 46. The sub-model 42 is subjected to learning using training data 312a for the sub-model. The main model 46 is subjected to learning using training data 312b for the main model. The training data 312a for the sub-model is data in which the power spectrum of the wireless signal is associated with the frequency-specific noise presence/absence information. The power spectrum of the wireless signal is data indicating the radio wave environment of the wireless base station 10, and specifically, N pieces of data obtained by the discrete Fourier transform with the normalization of the amplitude and phase of the wireless signal. The frequency-specific noise presence/absence information is frequency-specific noise presence/absence information based on the SNR at which the wireless base station 10 performed wireless communication under the relevant radio wave environment. The sub-model 42 is generated by learning with the data indicating the radio wave environment (power spectrum) as an input and with the frequency-specific noise presence/absence information as an output.

The training data 312b for the main model is data in which the signal power of the wireless signal is associated with the frequency-specific communication status information. The signal power of the wireless signal is data indicating the radio wave environment of the wireless base station 10, and specifically, the signal power normalized by the noise power. The frequency-specific communication status information is frequency-specific communication status information based on the SNR at which the wireless base station 10 performed wireless communication under the relevant radio wave environment. The main model 46 is generated by learning with the data indicating the radio wave environment (signal power) as an input and with the frequency-specific communication status information as an output. The type of the learning is deep learning in the present embodiment, but may be any other type of machine learning.

The training data 312 can be generated by using actual wireless signal data or by performing a computer simulation. Specifically, parameters for a wireless communication standard, a wireless propagation characteristic, or the like are set, and a transmission signal is generated for transmission of arbitrary transmission data under the set wireless communication standard. Then, a wireless signal that is assumed to be received by the wireless base station 10 when this transmission signal is transmitted via the wireless channel of the set wireless propagation characteristic is estimated. The power spectrum of the estimated wireless signal (N pieces of data obtained by the discrete Fourier transform with the normalization of the amplitude and phase) and the signal power of the wireless signal (signal power normalized by the noise power) are calculated as the data indicating the radio wave environment. Furthermore, the frequency-specific noise presence/absence information and the frequency-specific communication status information are calculated by determining the SNR of the transmission signal by frequency, from the power spectrum of the wireless signal and the transmission signal. Then, the data indicating the radio wave environment (power spectrum) and the frequency-specific noise presence/absence information are set as one piece of training data 312 for the sub-model. The data indicating the radio wave environment (signal power of the wireless signal normalized by the noise power) and the frequency-specific communication status information are set as one piece of training data 312 for the main model. Various parameters for the wireless communication standard and wireless propagation characteristic can be set to generate a large number of pieces of training data 312.

(B) Evaluation Value Inference Machine Learning Model

The evaluation value inference machine learning model 50 is a machine learning model for inferring an evaluation value of the frequency-specific communication status in a future period around the corresponding wireless base station 10, based on the frequency-specific time-series communication status data inferred by the communication status inference machine learning model 40. The evaluation value inference machine learning model 50 is implemented by a recurrent neural network (RNN), but may be implemented by another neural network. The evaluation value inference machine learning model 50 is a machine learning model that has undergone learning using a past dataset as described later, and has a weight coefficient determined therefor.

Figure 6:
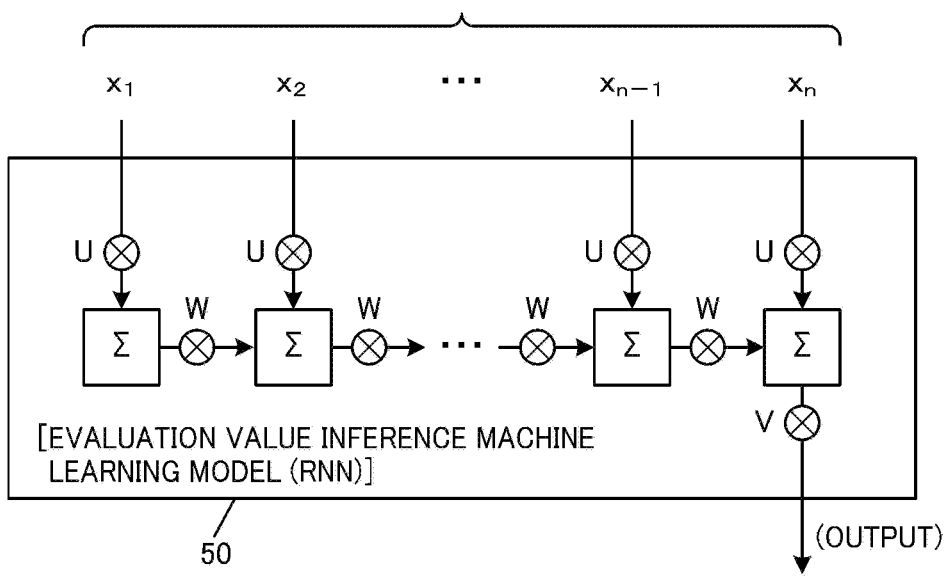
FIG. 6 is an explanatory diagram of an evaluation value inference machine learning model.

FIG. 6 is a schematic diagram illustrating the evaluation value inference machine learning model 50. As illustrated in FIG. 6, the evaluation value inference machine learning model 50 takes an input of frequency-specific time-series communication status data in a predetermined preceding period from t0 to t1 going back to the past from a predetermined time t1 (e.g., current time) out of the frequency-specific time-series communication status data output by the communication status inference machine learning model 40. Since the time-series communication status data is the discrete time-series data, n pieces of data (x1, x2 . . . , xn−1, and xn) are input by frequency as the time-series communication status data during the preceding period from t0 to t1. Then, the evaluation value inference machine learning model 50 outputs an evaluation value B of the frequency-specific communication status during a future period from t1 to t2 following the preceding period from t0 to t1. The evaluation value B is a value indicating the communication status over the entire future period from t1 to t2. In the present embodiment, the evaluation value B is classified into six stages of "0 to 5". However, the classification may have five or less stages or may have seven or more stages. As the evaluation value B becomes larger, the possibility of the wireless communication being performed at the relevant frequency (the relevant frequency being used) is higher. In the wireless train control system 1, the wireless communication being performed means that the relevant frequency is being used by another wireless communication system, which causes noises. Thus, the larger the evaluation value B becomes, the more the noise increase.

Figure 7:
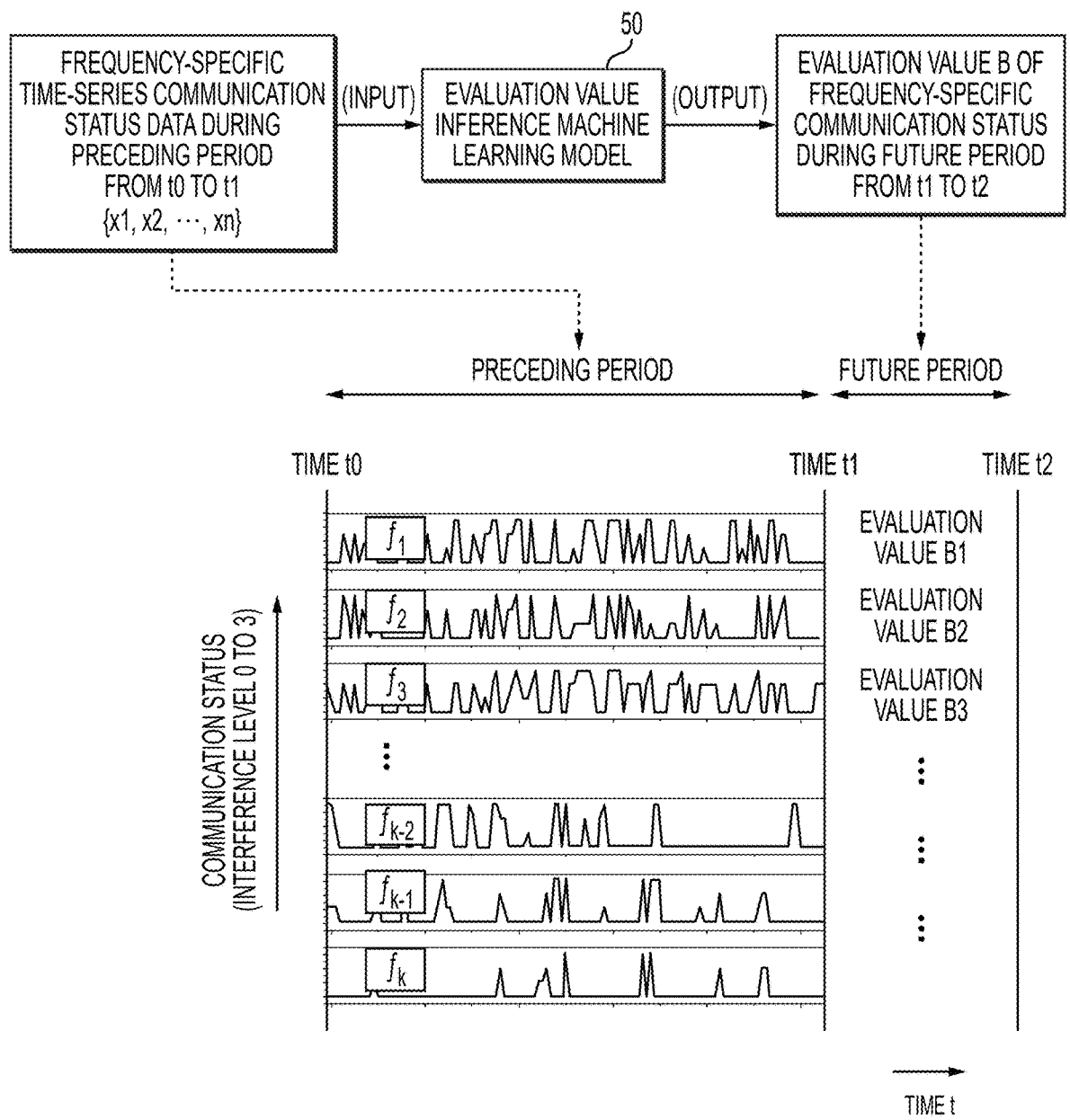
FIG. 7 is an input/output example of the evaluation value inference machine learning model.

FIG. 7 is an input/output example of the evaluation value inference machine learning model 50. In FIG. 7, the horizontal axis represents time t, and the input data and the output data are indicated for each of k frequencies (f1, f2 . . . , and fk: wireless channel). The input data is the time-series communication status data during the preceding period from t0 to t1. The output data is the evaluation value B of the communication status during the future period from t1 to t2 following the preceding period from t0 to t1. As for the input, the vertical axis represents the interference level of the communication status. As illustrated in FIG. 7, the evaluation value inference machine learning model 50 takes the input of the frequency-specific communication status (interference level) during the preceding period from t0 to t1 in time series from the communication status inference machine learning model 40, and outputs the evaluation value B of the frequency-specific communication status in the future during the future period from t1 to t2. In FIG. 7, the communication status input to the evaluation value inference machine learning model 50 is each shown as a temporally continuous graph. However, the communication status is actually the time-series data (frequency-specific time-series data) that is discrete at predetermined time intervals.

Figure 8:
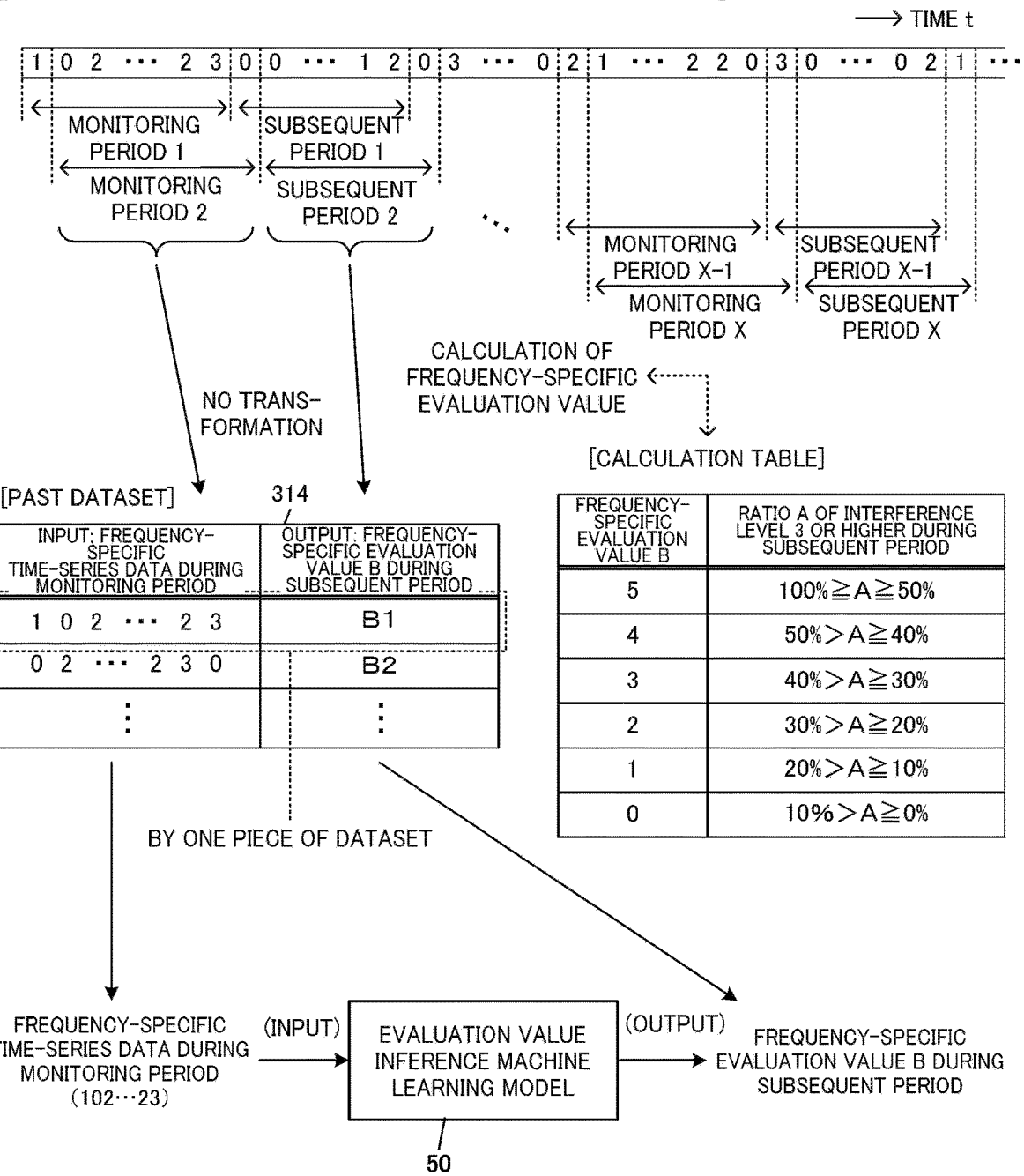
FIG. 8 is an explanatory diagram of learning of the evaluation value inference machine learning model.

FIG. 8 is an explanatory diagram of learning of the evaluation value inference machine learning model 50. As illustrated in FIG. 8, learning of the evaluation value inference machine learning model 50 is performed using a past dataset 314 acquired. The past dataset 314 is data in which the frequency-specific time-series data is associated with frequency-specific evaluation value data. The frequency-specific time-series data is data indicating the frequency-specific communication status of the wireless base station 10 based on the SNR in time series over a predetermined monitoring period. The frequency-specific evaluation value data is data indicating the evaluation value evaluating the communication status during a subsequent period following the monitoring period by frequency. The monitoring period in the past dataset 314 is a period having the same length of time as that of the preceding period from t0 to t1 in the data input to the evaluation value inference machine learning model 50. The subsequent period is a period having the same length of time as that of the future period from t1 to t2 in the data output from the evaluation value inference machine learning model 50.

As illustrated in FIG. 8, the past dataset 314 can be acquired based on the frequency-specific time-series communication status data acquired from data of the actual wireless signal. FIG. 8 illustrates an example of the discrete time-series data in which the communication status is represented by the interference levels "0 to 3", as the time-series communication status data of one frequency (wireless channel). With this time-series communication status data, a plurality of monitoring periods are defined such that these periods shift one another by one piece of data to partially overlap, and the subsequent period following each of the monitoring periods is defined. Then, the time-series communication status data in the monitoring period and the evaluation value B based on the time-series data in the subsequent period following the corresponding monitoring period are associated to form one piece of dataset. This enables acquisition of the past dataset 314 including the dataset of a plurality of pieces of the frequency-specific time-series data during the monitoring periods shifting behind in order to partially overlap and the frequency-specific evaluation value data during the subsequent period following each of the corresponding monitoring periods.

The evaluation value B is calculated as a ratio in which the interference level of the communication status over the entire subsequent period is at a predetermined level or higher (e.g., "3" or higher). Specifically, as illustrated in a calculation table in FIG. 8, the evaluation value B is calculated as a ratio of a number of pieces of data with the interference level at the predetermined level or higher (e.g., "3" or higher) relative to a number of pieces of data over the entire subsequent period. Then, the evaluation value inference machine learning model 50 is generated by learning with the frequency-specific time-series data during the monitoring period in the past dataset 314 as an input and with the evaluation value B of the communication status during the subsequent period as an output.

(C) Frequency Determination Section

The frequency determination section 210 determines the frequency (wireless channel) to be used by the wireless base station 10 for the wireless communication based on the frequency-specific time-series communication status data during the preceding period from t0 to t1 input from the communication status inference machine learning model 40 and the frequency-specific evaluation value data during the future period from t1 to t2 input from the evaluation value inference machine learning model 50.

Figure 9:
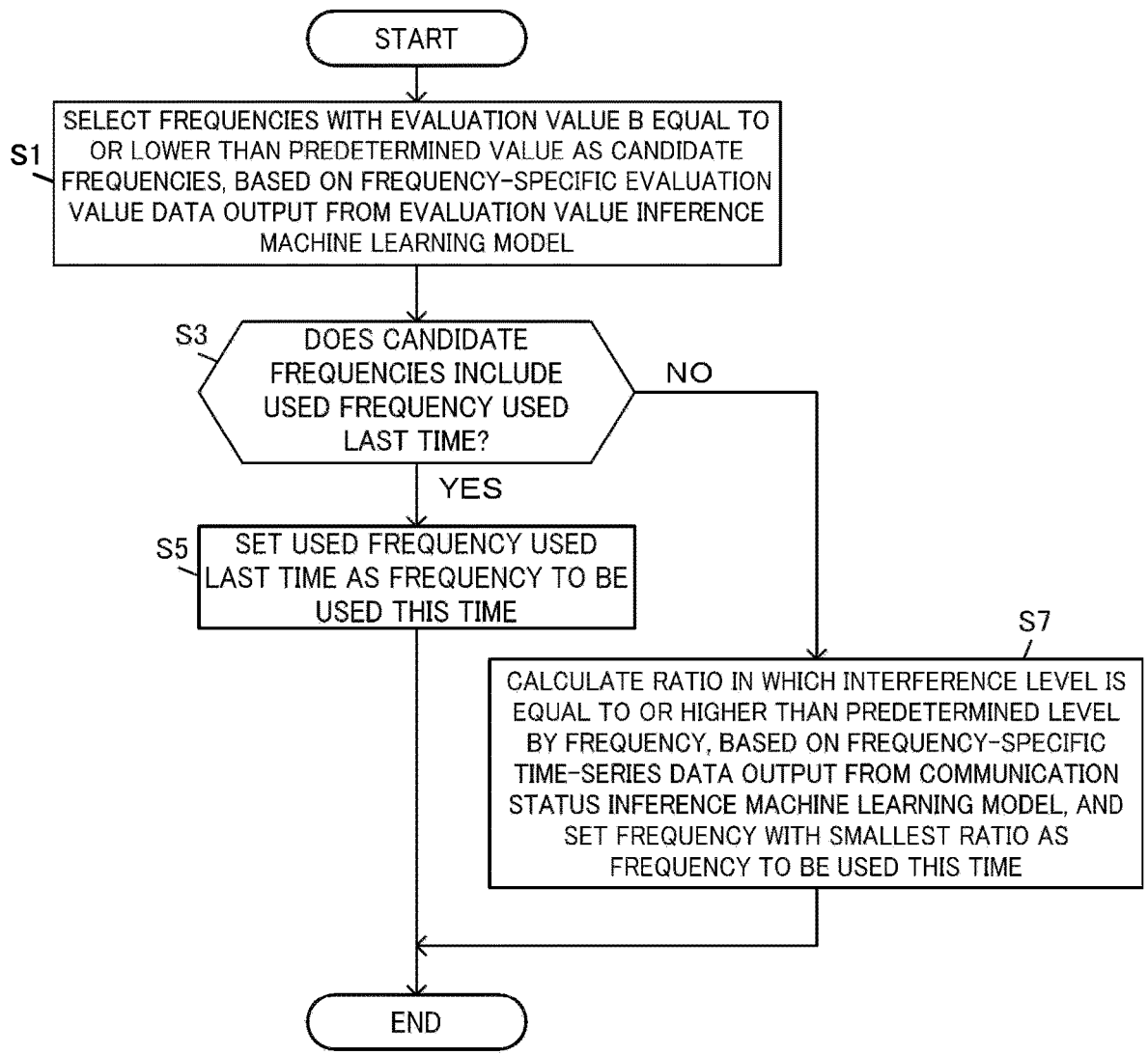
FIG. 9 is a flowchart of a process of determining a frequency to be used.

FIG. 9 is a flowchart illustrating the determination of the frequency to be used by the frequency determination section 210. As illustrated in FIG. 9, the frequency determination section 210 first selects, as candidate frequencies, the frequencies whose evaluation values B are within a predetermined number of stages (e.g., two) counted from the smallest (lowest) stage, based on the evaluation values B of the frequency-specific communication status during the future period from t1 to t2 output from the evaluation value inference machine learning model 50 (step S1). In the present embodiment, the evaluation value B is classified into six stages of "0 to 5". Selecting the "two" stages from the smallest means selecting the frequencies whose evaluation values B are "0" or "1" as the candidate frequencies.

Next, the frequency determination section 210 determines whether the selected candidate frequencies include the used frequency used last time (immediately before). When they do (step S3: YES), the frequency determination section 210 determines the used frequency used last time (immediately before) as the frequency to be successively used this time (step S5). When the candidate frequencies do not include the used frequency used last time (step S3: NO), the frequency determination section 210 determines the frequency to be used this time based on the frequency-specific time-series communication status data input from the communication status inference machine learning model 40 (step S7). Specifically, the frequency determination section 210 calculates, by frequency, the ratio in which the interference level of the communication status over the entire subsequent period is at a predetermined level or higher (e.g., "2" or higher), that is, the ratio of a number of pieces of data with the interference level at the predetermined level or higher (e.g., "2" or higher) relative to a number of pieces of data over the entire subsequent period. Then, the frequency determination section 210 determines the frequency having the smallest calculated ratio as the frequency to be used this time.

[Generation of Machine Learning Model]

As described above, the machine learning models including the sub-model 42 and the main model 46 included in the communication status inference machine learning model 40 and the evaluation value inference machine learning model 50 are generated by determining the weight coefficient of the neural network, using the training data (the training data 312a for the sub-model 42, the training data 312b for the main model 46, and the past dataset 314 for the evaluation value inference machine learning model 50). In order to generate the machine learning models with higher accuracy, a method used in the present embodiment for determining the weight coefficient is a stochastic gradient descent method.

Specifically, two sets of training data of different content are prepared as the training data for generating the machine learning model. One set of the training data is used first to obtain a weight coefficient Wn for the machine learning model by the stochastic gradient descent method from a suitable initial point IPn (initial value of the weight coefficient). Then, the other set of the training data is used for the machine learning model applied with the obtained weight coefficient Wn to calculate inference accuracy. The inference accuracy is calculated, for example, as a square mean value of differences between inference values output in response to the input of the input data of the other set of the training data to the machine learning model and the output data associated with the relevant input data. When the inference accuracy is equal to or higher than a predetermined threshold, the obtained weight coefficient Wn is employed. When the inference accuracy is lower than the threshold, the initial point IPn is changed and similar processing is repeated again.

[Functional Configuration]

Figure 10:
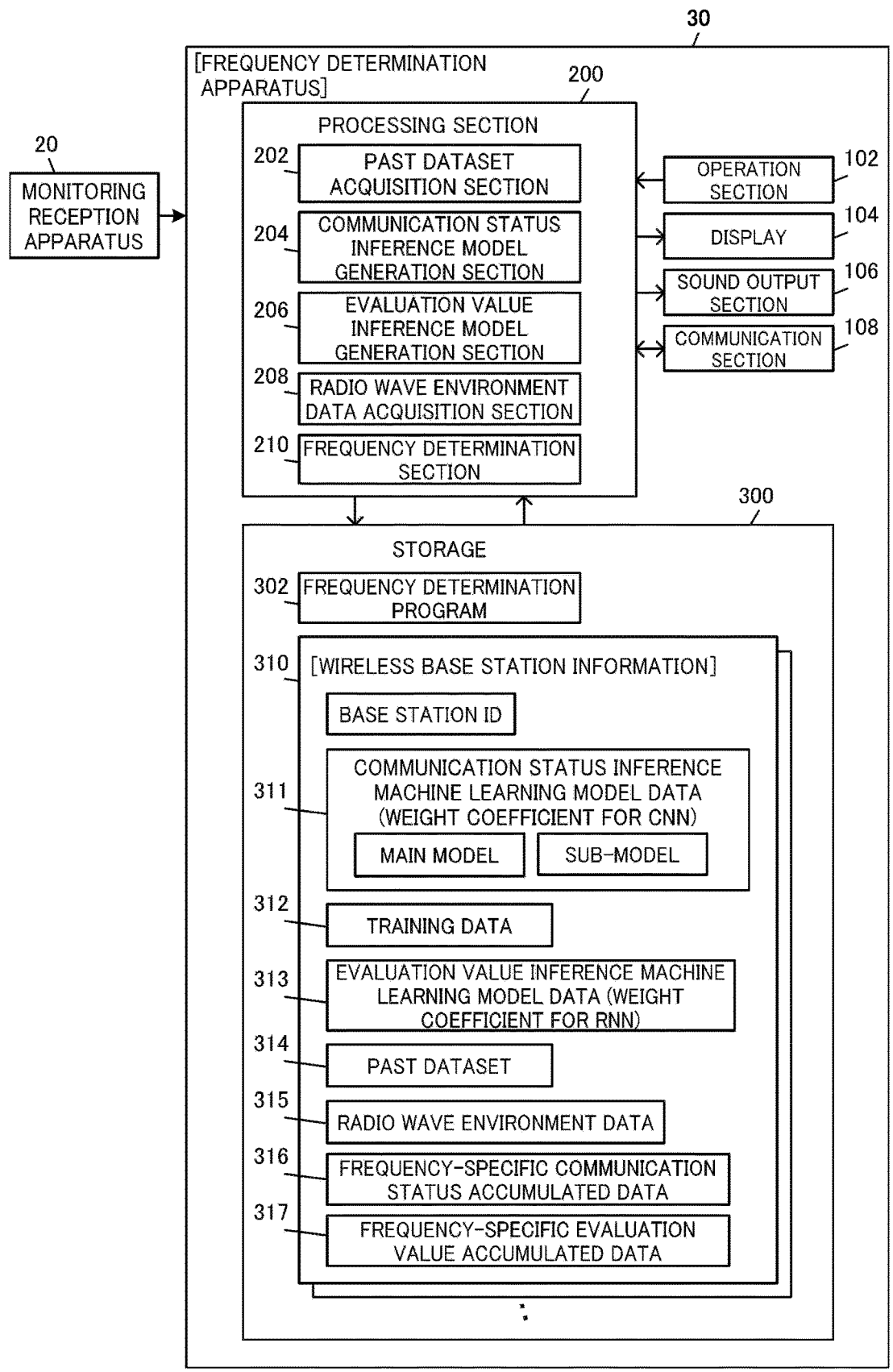
FIG. 10 is a functional configuration diagram of the frequency determination apparatus.

FIG. 10 is a functional configuration diagram of the frequency determination apparatus 30. According to FIG. 10, the frequency determination apparatus 30 includes an operation section 102, a display 104, a sound output section 106, a communication section 108, a processing section 200, and a storage 300. That is, the frequency determination apparatus 30 can constitute a kind of computer system.

The operation section 102 is implemented by an input device such as a keyboard, a mouse, a touch panel, and various switches, and outputs an operation signal corresponding to a received operation to the processing section 200. The display 104 is implemented by a display device such as a liquid crystal display or a touch panel, to provide various indications according to a display signal from the processing section 200. The sound output section 106 is implemented by a sound output device such as a speaker, and provides various sound outputs according to a sound signal from the processing section 200. The communication section 108 is implemented by a wired or wireless communication device, which is connected to the terrestrial transmission line N to communicate with various external apparatuses such as the wireless base stations 10 and the monitoring reception apparatuses 20.

The processing section 200 is a processor implemented by a calculation apparatus or a calculation circuit such as a central processing unit (CPU) or a field programmable gate array (FPGA), and performs overall control of the frequency determination apparatus 30 based on programs and data stored in the storage 300, input data from the operation section 102, and others. The processing section 200 includes, as functional processing blocks, a past dataset acquisition section 202, a communication status inference model generation section 204, an evaluation value inference model generation section 206, a radio wave environment data acquisition section 208, and the frequency determination section 210. These functional sections included in the processing section 200 may be implemented software-wise by the processing section 200 executing programs or may be implemented by a dedicated calculation circuit. In the present embodiment, the functional sections are implemented software-wise.

The past dataset acquisition section 202 acquires the past dataset 314 in which the given frequency-specific time-series data is associated with the frequency-specific evaluation value data. The given frequency-specific time-series data is data indicating the frequency-specific communication status of the wireless base station 10 installed along the railroad line to perform the wireless communication with the onboard system 82 based on the SNR over the predetermined monitoring period in time series. The frequency-specific evaluation value data is data indicating the evaluation value evaluating the communication status during the subsequent period following the monitoring period by frequency. The past dataset 314 includes the dataset of the plurality of pieces of the frequency-specific time-series data during the monitoring periods shifting behind in order to partially overlap and the frequency-specific evaluation value data corresponding to each of the plurality of pieces of the frequency-specific time-series data (see FIG. 8).

The past dataset acquisition section 202 also acquires the communication status data in sequence by inputting the data indicating the radio wave environment to the communication status inference machine learning model 40 in time series. The communication status inference machine learning model 40 is the machine learning model that has undergone learning based on the training data 312 in which the data indicating the radio wave environment of the wireless base station 10 is associated with the frequency-specific communication status under the relevant radio wave environment. With the sequentially acquired communication status data, the past dataset acquisition section 202 acquires the past dataset 314 by 1) setting the data corresponding to the monitoring period as the frequency-specific time-series data, and 2) setting the data obtained by calculating the evaluation value by frequency from the data corresponding to the subsequent period following the relevant monitoring period as the frequency-specific evaluation value data.

The past dataset acquisition section 202 also inputs the data indicating the radio wave environment to the sub-model 42 included in the communication status inference machine learning model 40 to acquire the frequency-specific noise presence/absence information. Then, the past dataset acquisition section 202 inputs the data indicating the radio wave environment and the acquired frequency-specific noise presence/absence information to the main model 46 included in the communication status inference machine learning model 40 to acquire the communication status data, and thereby acquires the communication status data in sequence.

The communication status inference model generation section 204 generates, using the training data 312, the communication status inference machine learning model 40 that takes an input of the data indicating the radio wave environment and outputs the frequency-specific communication status under the relevant radio wave environment. The communication status inference machine learning model 40 includes the sub-model 42 and the main model 46. The sub-model 42 is the machine learning model that has undergone learning based on the training data 312a in which the data indicating the radio wave environment is associated with the frequency-specific noise presence/absence information. The main model 46 is the machine learning model that has undergone learning based on the training data 312b in which the data indicating the radio wave environment and the noise presence/absence information are associated with the frequency-specific communication status.

The evaluation value inference model generation section 206 generates, using the past dataset 314 acquired by the past dataset acquisition section 202, the evaluation value inference machine learning model 50 that takes an input of the frequency-specific time-series data and outputs the frequency-specific evaluation value data (see FIG. 8). The evaluation value inference machine learning model 50 is a recurrent neural network, for example.

The radio wave environment data acquisition section 208 acquires the data indicating the radio wave environment of the wireless base station 10. Specifically, the radio wave environment data acquisition section 208 acquires N pieces of data obtained as the power spectrum by the discrete Fourier transform with the normalization of the amplitude and phase of the wireless signal received by the monitoring reception apparatus 20 installed in the vicinity of the wireless base station 10, as the data indicating the radio wave environment of the relevant wireless base station 10. The radio wave environment data acquisition section 208 also acquires the signal power of the received wireless signal as the data indicating the radio wave environment.

The frequency determination section 210 inputs the frequency-specific time-series data with the given preceding period as the monitoring period to the evaluation value inference machine learning model 50 to acquire the output of the frequency-specific evaluation value data with the future period following the relevant preceding period as the subsequent period. Then, the frequency determination section 210 determines the frequency to be used for the wireless communication based on the acquired frequency-specific evaluation value data. Specifically, the frequency determination section 210 selects the candidate frequencies based on the acquired frequency-specific evaluation value data. Then, the frequency determination section 210 determines the frequency to be used this time, using the used frequency determined last time and the candidate frequencies (see FIG. 9). The frequency-specific time-series data (frequency-specific time-series communication status data) during the monitoring period to be input to the evaluation value inference machine learning model 50 is the frequency-specific communication status data output in time series from the communication status inference machine learning model 40 in response to the input of the data indicating the radio wave environment acquired by the radio wave environment data acquisition section 208 to the communication status inference machine learning model 40 in time series.

The storage 300 is implemented by an integrated circuit (IC) memory such as a read only memory (ROM) or a random access memory (RAM), and a storage device such as a hard disk, and stores programs and data for the processing section 200 to comprehensively control the frequency determination apparatus 30. The storage 300 is used as a work area of the processing section 200, and temporarily stores results of calculations executed by the processing section 200, input data input through the operation section 102, or the like. In the present embodiment, the storage 300 stores a frequency determination program 302 and wireless base station information 310.

The wireless base station information 310 is generated for each wireless base station 10 and stores, in association with identification information of the corresponding wireless base station 10 (base station ID), communication status inference machine learning model data 311, the training data 312 used for generating the communication status inference machine learning model 40, evaluation value inference machine learning model data 313, the past dataset 314 acquired by the past dataset acquisition section 202 and used for generating the evaluation value inference machine learning model 50, radio wave environment data 315, frequency-specific communication status accumulated data 316, and frequency-specific evaluation value accumulated data 317.

The communication status inference machine learning model data 311 is data that defines the communication status inference machine learning model 40 for the corresponding wireless base station 10, and specifically, is data of the weight coefficient. This data is generated by the communication status inference model generation section 204. The training data 312 is data used for generating the communication status inference machine learning model 40 by the communication status inference model generation section 204. The evaluation value inference machine learning model data 313 is data that defines the evaluation value inference machine learning model 50 for the corresponding wireless base station 10, and specifically, is data of the weight coefficient. This data is generated by the evaluation value inference model generation section 206. The past dataset 314 is acquired by the past dataset acquisition section 202, and is data used for generating the evaluation value inference machine learning model 50 by the evaluation value inference model generation section 206. The radio wave environment data 315 is data acquired by the radio wave environment data acquisition section 208, and is data indicating the radio wave environment of the corresponding wireless base station 10. The frequency-specific communication status accumulated data 316 is frequency-specific time-series accumulated data of the communication status acquired using the communication status inference machine learning model 40 for the corresponding wireless base station 10. The frequency-specific evaluation value accumulated data 317 is frequency-specific time-series accumulated data of the evaluation value B acquired using the evaluation value inference machine learning model 50 for the corresponding wireless base station 10.

Advantageous Effects

According to the present embodiment, it is possible to realize a technique capable of selecting the vacant frequency with high accuracy as a technique to determine the frequency to be used in the wireless train control system. That is, it is possible to generate the evaluation value inference machine learning model 50 that takes an input of the time-series data indicating the frequency-specific communication status based on the SNR at which the wireless base station 10 performed wireless communication with the onboard system 82 over the predetermined monitoring period, and outputs the evaluation data of the communication status during the subsequent period following the relevant monitoring period. It is then possible to determine the frequency to be used for the wireless communication by the wireless base station 10 based on the frequency-specific evaluation value data during the subsequent period acquired in response to the input of the frequency-specific time-series communication status data during the preceding period to the evaluation value inference machine learning model 50. As a result, it is possible to infer the communication status during the future period following the relevant preceding period as the evaluation value from the frequency-specific communication status during the preceding period, and thereby to realize the technique capable of selecting the vacant frequency with high accuracy as the technique to determine the frequency to be used in the wireless train control system.

The embodiments to which the present disclosure is applicable are not limited to the above-described embodiment and can be changed as appropriate without deviating from the gist of the present disclosure.

(A) Number of Frequencies to Be Used

For example, the frequency determination apparatus 30 may determine a plurality of frequencies as frequencies to be used. In this case, the frequency determination section 210 may determine the used frequencies used last time as the frequencies to be used this time when the candidate frequencies include the used frequencies used last time. In addition, the frequency determination apparatus 30 may calculate the ratio in which the interference level is at a predetermined level or higher by frequency based on the frequency-specific time-series communication status data output from the communication status inference machine learning model 40, and select the frequencies as the frequencies to be used in ascending order from the frequency having the smallest calculated ratio so as to determine the plurality of frequencies to be used (see FIG. 9).

(B) Monitoring Reception Apparatus 20

In the above-described embodiment, the monitoring reception apparatuses 20 are associated with the wireless base stations 10 on a one-to-one basis and are installed in the vicinity of the corresponding wireless base stations 10. Instead, the monitoring reception apparatuses 20 may be installed at arbitrary positions. In this case, for example, the communication status around each of the wireless base stations 10 is inferred based on the wireless signal received by the monitoring reception apparatus 20 closest to the installation position of the relevant wireless base station 10.

Alternatively, the wireless base stations 10 may also serve as the monitoring reception apparatuses 20. In this case, the frequency determination apparatus 30 infers the communication status around the wireless base station 10 based on the wireless signal received by the relevant wireless base station 10.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

The invention claimed is:

1. A frequency determination method executed by a computer system,
   the computer system executing:
   acquiring a past dataset in which given frequency-specific time-series data indicating frequency-specific communication status of a wireless base station installed along a railroad line to perform wireless communication with an onboard system based on a signal-to-noise ratio (SNR) over a predetermined monitoring period in time series is associated with frequency-specific evaluation value data indicating an evaluation value evaluating the communication status during a subsequent period following the monitoring period by frequency;
   generating, using the past dataset, an evaluation value inference machine learning model that takes an input of the frequency-specific time-series data and outputs the frequency-specific evaluation value data; and
   inputting the frequency-specific time-series data with a given preceding period as the monitoring period to the evaluation value inference machine learning model to acquire an output of the frequency-specific evaluation value data with a future period following the relevant preceding period as the subsequent period, and determining a frequency to be used for the wireless communication based on the acquired frequency-specific evaluation value data.

2. The frequency determination method as defined in claim 1, wherein
   the evaluation value inference machine learning model is a recurrent neural network, and
   the past dataset includes a dataset of a plurality of pieces of the frequency-specific time-series data during monitoring periods shifting behind in order to partially overlap and the frequency-specific evaluation value data corresponding to each of the plurality of pieces of the frequency-specific time-series data.

3. The frequency determination method as defined in claim 1, wherein determining the frequency to be used includes
   selecting candidate frequencies based on the acquired frequency-specific evaluation value data, and
   determining the frequency to be used this time using a used frequency determined last time and the candidate frequencies.

4. The frequency determination method as defined in claim 2, wherein determining the frequency to be used includes
   selecting candidate frequencies based on the acquired frequency-specific evaluation value data, and
   determining the frequency to be used this time using a used frequency determined last time and the candidate frequencies.

5. The frequency determination method as defined in claim 1, wherein acquiring the past dataset includes
   sequentially acquiring communication status data by inputting data indicating a radio wave environment of the wireless base station in time series to a communication status inference machine learning model that has undergone learning based on training data in which the data indicating the radio wave environment of the wireless base station is associated with the frequency-specific communication status under the relevant radio wave environment, and
   acquiring the past dataset, with the sequentially acquired communication status data, by 1) setting data corresponding to the monitoring period as the frequency-specific time-series data, and 2) setting data obtained by calculating the evaluation value by frequency from data corresponding to the subsequent period following the relevant monitoring period as the frequency-specific evaluation value data.

6. The frequency determination method as defined in claim 2, wherein acquiring the past dataset includes
   sequentially acquiring communication status data by inputting data indicating a radio wave environment of the wireless base station in time series to a communication status inference machine learning model that has undergone learning based on training data in which the data indicating the radio wave environment of the wireless base station is associated with the frequency-specific communication status under the relevant radio wave environment, and
   acquiring the past dataset, with the sequentially acquired communication status data, by 1) setting data corresponding to the monitoring period as the frequency-specific time-series data, and 2) setting data obtained by calculating the evaluation value by frequency from data corresponding to the subsequent period following the relevant monitoring period as the frequency-specific evaluation value data.

7. The frequency determination method as defined in claim 5, wherein
the communication status inference machine learning model includes a sub-model and a main model,
the sub-model is a model that has undergone learning based on training data in which the data indicating the radio wave environment is associated with frequency-specific noise presence/absence information,
the main model is a model that has undergone learning based on training data in which the data indicating the radio wave environment and the noise presence/absence information are associated with the frequency-specific communication status, and
sequentially acquiring the communication status data includes
acquiring the frequency-specific noise presence/absence information by inputting the data indicating the radio wave environment to the sub-model, and
acquiring the communication status data by inputting the data indicating the radio wave environment and the acquired frequency-specific noise presence/absence information to the main model.

8. The frequency determination method as defined in claim 6, wherein
the communication status inference machine learning model includes a sub-model and a main model,
the sub-model is a model that has undergone learning based on training data in which the data indicating the radio wave environment is associated with frequency-specific noise presence/absence information,
the main model is a model that has undergone learning based on training data in which the data indicating the radio wave environment and the noise presence/absence information are associated with the frequency-specific communication status, and
sequentially acquiring the communication status data includes
acquiring the frequency-specific noise presence/absence information by inputting the data indicating the radio wave environment to the sub-model, and
acquiring the communication status data by inputting the data indicating the radio wave environment and the acquired frequency-specific noise presence/absence information to the main model.

9. A frequency determination apparatus comprising:
an acquisition section that acquires a past dataset in which given frequency-specific time-series data indicating frequency-specific communication status of a wireless base station installed along a railroad line to perform wireless communication with an onboard system based on a signal-to-noise ratio (SNR) over a predetermined monitoring period in time series is associated with frequency-specific evaluation value data indicating an evaluation value evaluating the communication status during a subsequent period following the monitoring period by frequency;
a generation section that generates, using the past dataset, an evaluation value inference machine learning model that takes an input of the frequency-specific time-series data and outputs the frequency-specific evaluation value data; and
a determination section that inputs the frequency-specific time-series data with a given preceding period as the monitoring period to the evaluation value inference machine learning model to acquire an output of the frequency-specific evaluation value data with a future period following the relevant preceding period as the subsequent period, and determines a frequency to be used for the wireless communication based on the acquired frequency-specific evaluation value data.

\* \* \* \* \*